United States Patent [19]
Doty

[11] 3,984,191
[45] Oct. 5, 1976

[54] CAPTIVE SPRING CLIP

[75] Inventor: Gerald A. Doty, Crown Point, Ind.

[73] Assignee: The Anderson Company, Gary, Ind.

[22] Filed: May 9, 1975

[21] Appl. No.: 576,217

Related U.S. Application Data

[63] Continuation of Ser. No. 530,758, Dec. 9, 1974, which is a continuation of Ser. No. 399,298, Sept. 21, 1973, abandoned.

[52] U.S. Cl. .............................. 403/69; 24/211 K; 403/155; 85/5 N
[51] Int. Cl.² ..................... F16B 9/00; A44B 17/00
[58] Field of Search .................. 24/211 K, 230.1 L; 16/16; 403/67, 69, 70, 71, 315, 155; 85/8.3, 5 N

[56] References Cited
UNITED STATES PATENTS

| | | | |
|---|---|---|---|
| 1,597,090 | 8/1926 | McIlreevy | 85/5 N |
| 3,014,261 | 12/1961 | Nelson | 24/73 B |
| 3,061,340 | 10/1962 | Fernberg | 24/2 |
| 3,088,184 | 5/1963 | Bittner | 24/211 K |

FOREIGN PATENTS OR APPLICATIONS

| | | | |
|---|---|---|---|
| 612,244 | 1/1961 | Canada | 403/163 |
| 523,016 | 1/1920 | France | 24/255 AS |

*Primary Examiner*—Bernard A. Gelak
*Attorney, Agent, or Firm*—Wegner, Stellman, McCord, Wiles & Wood

[57] ABSTRACT

A fastener such as a clip or key is provided for securing two movable members together and which fastener is inseparable from one of said members and yet is easily operative for assembly and disassembly of said one member to or from said other member. The fastener has a mounting part which is a first planar portion with an open center section, said portion being guidingly trapped or captivated for reciprocating movement in a track in said one member. The fastener has an attaching part which is a second planar portion spaced from and joined to said first planar portion which second portion has a pair of resilient fingers adapted to be reciprocated with the mounting part between a locking position with said fingers in a groove in a projecting part of said other member and an unlocking position permitting said members to be separated.

8 Claims, 5 Drawing Figures

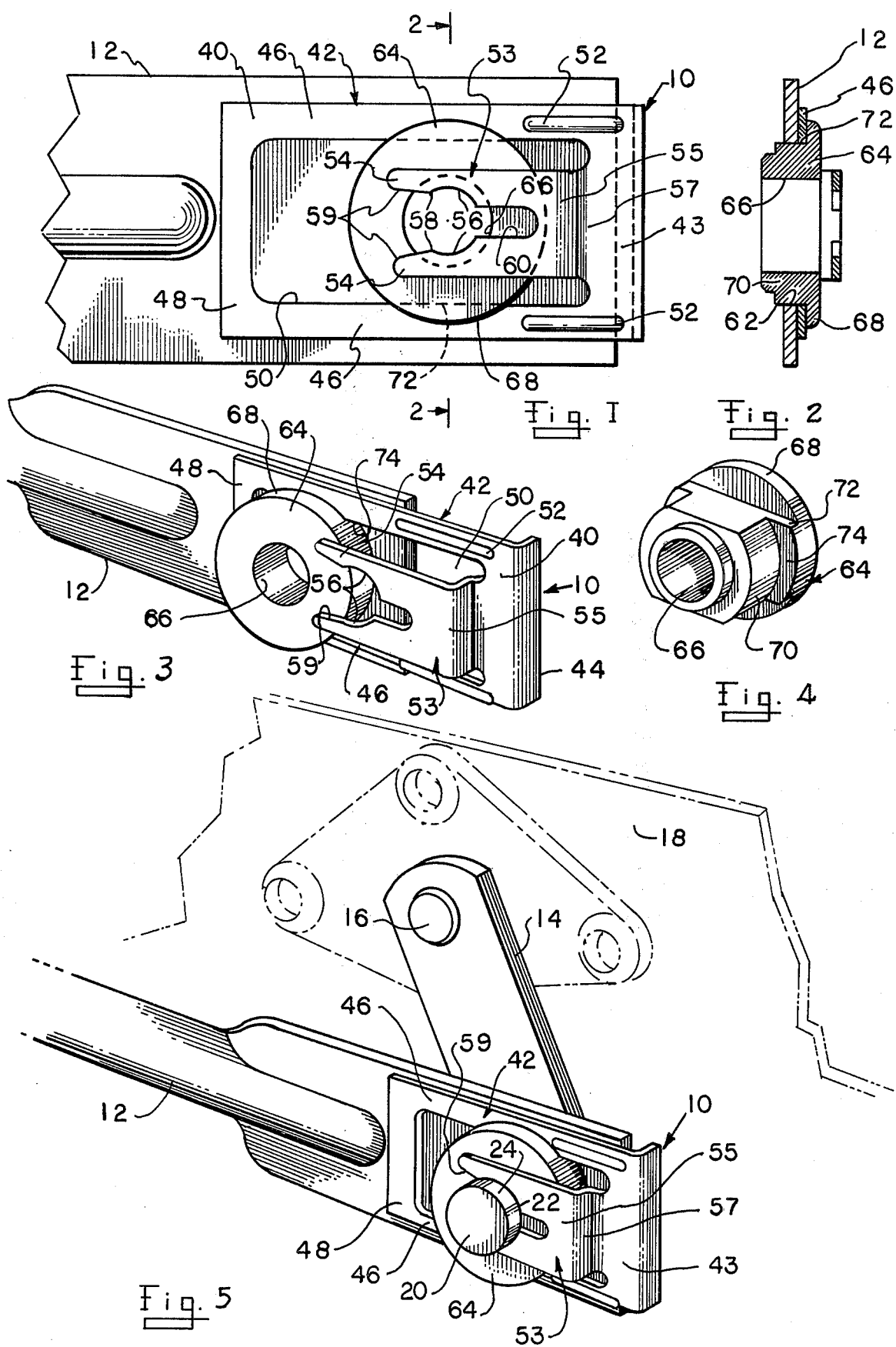

CAPTIVE SPRING CLIP

This is a streamline continuation application of application Ser. No. 530,758, filed Dec. 9, 1974, which application in turn was a streamline continuation application of Ser. No. 399,298, filed Sept. 21, 1973, now abandoned.

BACKGROUND OF THE INVENTION

Fastening clips have been known for a long time as a quick way of fastening parts onto a shaft or securing a pin in a bearing and the like. The shaft or pin has a groove cut into the cylindrical side wall at the point on the shaft or pin where the clip is to be affixed. The clip is inserted in the groove either by forcing the split in the clip open until the clip snaps past the high points in the groove or by using special tools for opening the clip so that it can be slid into the groove.

Often the location of the groove is awkward to reach especially where parts are bulky and are intended to be flush with one wall of the groove making the alignment and insertion of the clip almost impossible. Frequently, the clip will drop down into other parts of the machinery causing possible hazards to safe operation of the equipment. Special tools, such as a pair of pliers with pins on the jaws adapted to engage in openings in the free ends of the clip, are used to enlarge the opening in the clip so as to facilitate assembly of the clip in the retaining groove. Frequently the special tools are lost or misplaced and even when tools are available they are often not usable due to the limited space in and around the connection area.

Other problems result from the loss of the clip making assembly impossible or from the inconvenient inaccessible location of the connection making assembly and/or disassembly a virtual impossibility.

SUMMARY OF THE INVENTION

This invention relates to a fastener and more particularly to a captive spring clip fastener that is premounted on one of the two members being connected together.

To obviate the problems of the prior art, the present invention provides a fastener with a mounting part that is trapped for sliding movement on a first member such as a bearing sleeve carried by a link. A second member, such as a pin or shaft, carried by a crank which is to be removably connected to said first member is inserted in the bearing sleeve with a circumferential groove that is formed in said pin or shaft aligned with a pair of spring fingers of an attaching part of said fastener such that movement of the fastener toward the pin or shaft seats the spring fingers in said groove for locking the first and second members together. To disconnect the two members, the fastener is slid away from the pin or shaft whereupon the spring fingers leave the groove in the pin or shaft to release the connection. The mounting part of the fastener prevents the fastener from becoming lost or misaligned with the mating groove in the pin or shaft between connectors.

No special tools are required to hold or position the spring fingers on the fastener relative to the mating groove. The mounting part of the fastener, being trapped to the first member, provides the fastener with a two way locking capability. That is, the shaft cannot move axially in either direction relative to the bearing.

Due to the captive nature of the fastener and the simple linear movement needed to connect and disconnect the fastener from a mating groove in a pin or shaft, it becomes evident that the fastener can be used in what would normally be considered a virtually inaccessible location since all that is necessary is to be able to reach a screwdriver or other tool into operative connection with the handle of the fastener to push one way or the other for connection or disconnection of the fastener with the associated members.

The fastener cannot be lost or misplaced since it is always captivated on one member and it does not need special aligning or spreading tools in order to use it for a connection or disconnection operation.

DESCRIPTION OF THE DRAWINGS

FIG. 1 is a top perspective view of the improved fastener mounted on the end of one member of a pair of relatively movable members;

FIG. 2 is a cross-sectional view taken on the line 2—2 of FIG. 1;

FIG. 3 is a perspective view of the improved fastener of FIG. 1 with the fastener moved to a non-connecting position;

FIG. 4 is a rear perspective view of the bearing or bushing showing chords or slots forming the tracks in said bearing or bushing; and, FIG. 5 is a perspective view of the improved fastener of FIG. 3 in a connecting position for securing a pair of relatively movable members together.

DESCRIPTION OF THE PREFERRED EMBODIMENT

In almost every mechanical endeavor that makes use of relative moving members, it becomes necessary to provide a means for easily and quickly assembling and disassembling certain of the members for the purpose of repair, replacement, adjustment and the like. The present invention contemplates providing an improved releasable fastener captively held on one of a pair of members in such a way that movement of the fastener in one direction engages the fastener with a portion of the other one of the pair of members to hold them assembled. Movement of the fastener in the opposite direction disengages the fastener from the other one of the pair and permits the members to be disconnected.

In one preferred embodiment, illustrated in the drawings, shows a fastener 10 being used to connect a link 12 to a crank 14 in a vehicle windshield wiper drive system. The crank 14 is fixed on a shaft 16 which extends through the body 18 of vehicle. The link 12 is pivotally connected to the pin 20 which pin 20 is fixed to the crank 14 at the end opposite to the shaft 16. Reciprocation of the link 12 oscillates crank 14 and pin 20 about the axis of the shaft 16. The illustrated subject matter is in practice mounted behind the dashboard of the vehicle with considerable additional paraphernalia such as the wiring and the like for the dashboard gauges, switches and the like as well as the heating, air-conditioning, radio, defroster, safety padding, steering wheel, glove compartment and related equipment mounted on or under the dash and obscuring or completely hiding the aforementioned windshield wiper drive mechanism. To repair or replace parts of the wiper drive mechanism, it is necessary to disconnect the connection between the link and crank, which connection is, to say the least, difficult to see and manipulate.

For some time, fasteners consisting of split rings, clips and the like have been used for the connection between the link and crank, but those fasteners were easily dropped or lost or were almost impossible to line up and move into the fastening position.

The improved captive fastener 10 is provided for pivoting the link 12 to the pin 20 on the crank 14. The pin 20 has a circumferential undercut shoulder or groove 22 near the outer end 24. The fastener 10 in the form of a retainer clip or locking key 40 is preferably formed of resilient sheet metal having some spring characteristics. The clip or key 40 has a planar mounting part 42 which includes an end portion 43, a pair of spaced parallel, longitudinal arm portions 46 and a connecting end portion 48 defining an enclosed rectangular shaped opening 50 therebetween. The end portion 43 has a downturned tab or handle 44. A pair of longitudinally extending ribs 52 are formed in at least a portion of the parallel arms 46 to add stiffness or rigidity to the arms 46.

The clip or key 40 has a planar attaching part 53 which includes two intermediate undercut resilient fingers 54 having outer edges located inward of the arms 46 and being in a plane parallel to and spaced from the plane of the mounting part 42. The inner ends of the fingers 54 are connected together at base portion 55 which in turn is connected to the end portion 43 of the mounting part 42 by means of an upstanding wall 57. The outer ends of the fingers 54 have converging lead-in portions 59 tapered inwardly toward a pair of arcuately shaped spaced apart portions 56 and are joined with said arcuate portions 56 at points 58 which points are spaced apart a distance less than the outer diameter of the base of the groove 22 in the pin 20 so that the fingers 54 must be spread apart to pass the points 58 when the clip or key 40 is moved into place. In order to provide the fingers 54 with the appropriate flexibility, they are separated inwardly of the arcuately shaped portions 56 by a slot 60 such that the fingers 54 can be spread apart without permanently deforming the attaching part 53. The tab or handle 44 is sued to apply pressure for moving the clip or key 40 along the long axis of the rectangular opening in the mounting part to move the attaching part into locking engagement with the pin 20 or for disengaging the clip or key 40 from the pin when it is desired to take the connection apart.

The link 12 has a double D-shaped opening 62 near its outer end in which opening is seated a bearing or bushing 64 having a pin receiving aperture 66 therethrough. The bushing 64 has a large diameter portion 68, a smaller diameter portion 70 and a small diameter projecting ring 71. The opposite sides of the smaller diameter portion 70 are cut off along parallel chords to provide a double D-shaped portion which matches the size and shape of the double D-shaped opening 62 so that said portion on the bushing seats in said opening 62 in the link. The bushing 64 is secured in the opening 62 by any one of the well known methods such as a force fit, swagging over portions of the projecting parts or the like. The bushing 64 is provided with a mating pair of chords or two sides slots 72 in diametrically opposite sides of the large diameter portion 68 of the bushing 64 in close proximity to the stepdown shoulder 74 between the large diameter portion 68 and the smaller diameter double D-shaped portion 70.

The opening 50 in the mounting part 42 of the clip or key 40 receives the bushing 64 with the walls of the slots 72 engaging the inner edges of the long arms 46 of said clip or key 40. The fit between the arms 46 and the slots 72 is a free sliding fit. The smaller diameter double D-shaped portion 70 of the bushing with the clip or key 40 in the slots 72 is then inserted in the opening 62 in the link 12 and is fixed to said link in the designated manner. The clip or key 40 is now free to move back and forth along the long axis of the rectangular opening 50 relative to the bushing 64 within the limits imposed by the end portions 43 and 48 of the mounting part 42 of the clip. The fingers 54 of the attaching part 53 lie in a plane parallel to and in close proximity to the outer end wall of the bushing 64 and as the clip or key 40 is moved, the fingers move back and forth over said wall between one position with the arcuately shaped portions 56 aligned with the aperture 66 and another position with said fingers out of alignment with said aperture 66. The clip or key 40 is assembled with said link 12 in the same operation used to assemble the bushing 64 to said link 12 and once assembled, is permanently a part of said link and cannot be accidentally separated therefrom and lost.

To put the fastener 10 to use for pivotally connecting the link 12 to the crank 14, the pin 20 on the crank 14 is inserted in the aperture 66 in the bushing 64 with the circumferential groove 22 exposed beyond the end wall of the bushing. Pressure applied to the tab or handle 44 slides the clip or key 40 along the long axis of the rectangular opening 50 relative to the bushing with the converging lead-in portions 59 of the fingers engaging the base of the groove 22 to spread the fingers 54 until the constriction or points 58 ride past said base of the groove 22 whereupon the arcuately shaped portions 56 nest in said groove and are held therein by the resilience of the fingers 54 and the overlapping of the points 58 of said fingers. The clip or key 40 is now assembled and the link 12 and crank 14 can move relative to each other about the axis of the pin 20 without becoming separated.

To disconnect the clip or key 40, the tab or handle 44 is urged in a direction to move the fingers 54 laterally out of the grooves against the resistance of the spring in the fingers 54 in riding the fingers over the constriction or points 58. Once the fingers are out of engagement with the walls of the groove 22 in the pin, the pin 20 and crank 14 can be separated from the link 12 and bushing 64.

The clip or key 40 can be assembled or disassembled from the pin from remote locations using any available instrument that can transmit sliding forces one way or the other to the clip or key 40. The clip or key 40 will not drop out of place and become lost and, in fact, is always lined up for immediate reassembly even from a remote location.

Although this description has been directed to use of the captive fastener on a link and crank of a windshield wiper drive assembly, it is to be understood that it is intended for use on any equipment where a clip or key-type fastener is normally employed. All that is required is that some track arrangement be provided on one of the members being connected together for trapping the fastener in aligned captive position relative to a grooved portion of a part of the other member being connected so that the clip or key 40 cannot be lost and so that the clip or key 40 can be readily pressed into fastened condition in said grooved portion.

I claim:

1. A fastening clip slidably mounted on a projection on a member, said clip having a mounting part, an attaching part spaced from and connected to said mounting part along one edge thereof, said mounting part having a blind opening through the central portion thereof with at least two opposite planar sides of said opening having parallel edges slidably engaging with said projection, said attaching part having a pair of spaced apart fingers with arcuately shaped facing edges formed therein and overlying a portion of said opening in said mounting part, and handle means on the mounting part of said clip for receiving a force for moving said clip.

2. A captive fastening clip as claimed in claim 1 wherein converging lead-in portions are formed on the projecting end of said fingers for spreading and guiding said fingers.

3. A captive fastening clip as claimed in claim 1 wherein said blind opening in said mounting part is rectangular with the long sides of the rectangle engaging with tracks in said projection to permit movement of said clip along the long axis of the rectangle.

4. A captive fastening clip as claimed in claim 1 wherein reinforcing ridges are formed in the planar surfaces of said opposite sides of said mounting part to add rigidity to said sides.

5. A captive fastening clip slidably mounted on a projection on one member, said clip having a mounting part, an attaching part spaced from and connected to said mounting part along one edge thereof, said mounting part having a blind opening through the central portion thereof with at least two opposite planar sides of said opening having parallel edges, tracks formed in said projection on said member and adapted to be engaged by said parallel sides of the mounting part to slidably captivate said clip on said member, said attaching part having a pair of spaced apart fingers with arcuately shaped facing edges formed therein and overlying a portion of said opening in said mounting part, means on said clip for receiving a force for moving said clip, said tracks are slots cut in the side wall of said projection carried by said member, said parallel edges of said mounting part sliding in said slots as said arcuately shaped edges of said attaching part are moved into and out of alignment with an aperture in said projection.

6. A fastening clip having a mounting part and an attaching part attached together along one end of each, said mounting part having a closed rectangularly shaped opening therethrough with the two long sides of said rectangular opening forming guiding surfaces slidably engaging with a projection carried by a first member, said attaching part having a pair of spaced apart fingers lying in a plane spaced from the plane of said mounting part and being adapted to pass over the end of said projection, said fingers having arcuately shaped facing edges forming a constricted opening between said fingers, said constricted opening being aligned with a portion of said rectangular opening in the mounting part and a tab formed on one end of said mounting part for receiving force in the direction of the long axis of said rectangular opening, whereby a second member having a groove formed in the outer surface thereof when passed through an opening in said projection on the first member can be locked to said first member by the fingers of the attaching part engaging in said groove when said clip is urged toward said projection.

7. A fastening clip as claimed in claim 6 wherein converging lead-in portions are formed in the projecting end portions of said fingers, said converging portions connect with said arcuately shaped edges to define a constriction for blocking ready access to said arcuately shaped edges.

8. A fastening clip as claimed in claim 6 wherein stiffening ribs are formed in the two long sides of said mounting part.

* * * * *